UNITED STATES PATENT OFFICE.

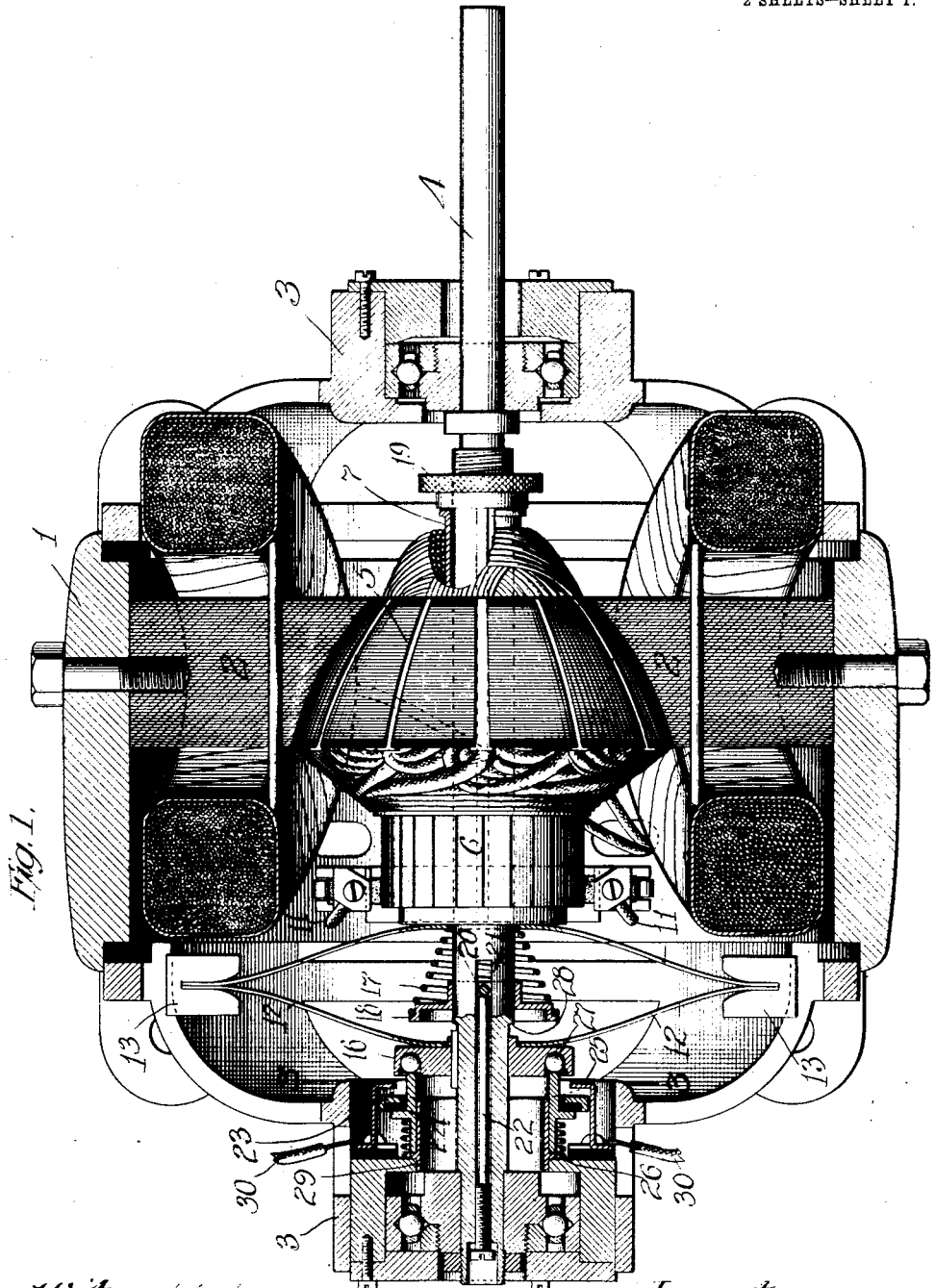

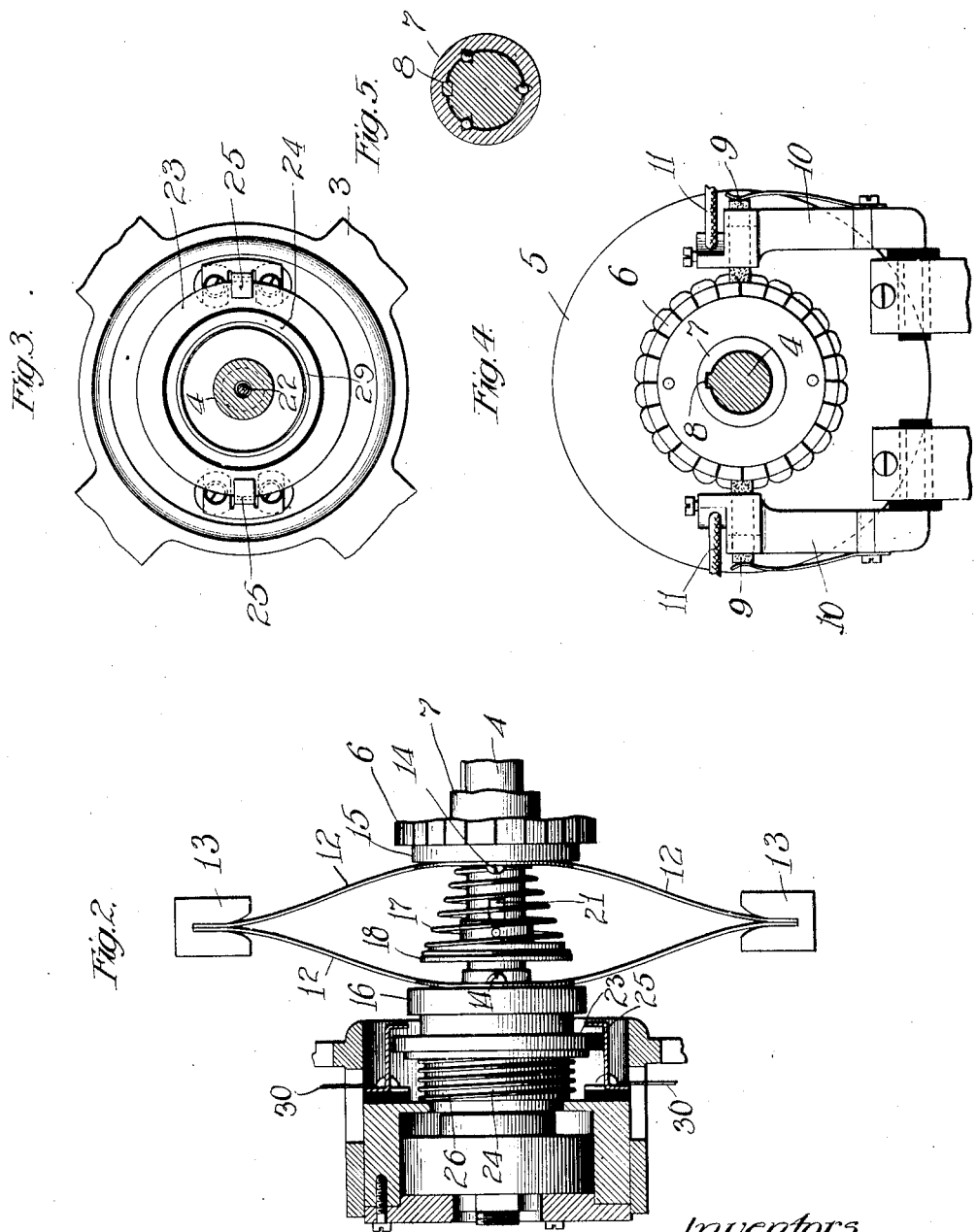

CHARLES H. ROTH AND WALTER J. WARDER, JR., OF CHICAGO, ILLINOIS.

VARIABLE-SPEED ELECTRIC GENERATOR.

1,039,197.  Specification of Letters Patent.  Patented Sept. 24, 1912.

Application filed November 3, 1909. Serial No. 526,050.

*To all whom it may concern:*

Be it known that we, CHARLES H. ROTH and WALTER J. WARDER, Jr., citizens of the United States of America, and residents of Chicago, county of Cook, State of Illinois, have invented certain new and useful Improvements in Variable-Speed Electric Generators, of which the following is a specification.

The main objects of this invention are to provide an improved form of electric generator particularly adapted for generating current in places where the power is supplied by a motor driven at varying speeds, as for instance, the engine of an automobile or railway train, a windmill, etc.; to provide a generator of this class which is capable of producing a current of practically constant voltage throughout a considerable range of speed variation; to provide improved means for automatically opening the circuit when the speed of rotation is insufficient to produce the desired minimum voltage and for automatically closing the circuit when the desired minimum speed is attained; to provide improved means for automatically increasing the air gap between the stator and rotor and thereby reducing the magnetic flux as the speed of the rotor increases so as to maintain the voltage practically constant and thereby produce a current suitable for charging storage batteries, for lighting and other purposes; to provide an improved form of magnetic frame structure for the rotors and stators of generators of this class; to provide an improved form of governor for shifting the rotor axially; and to provide improved means for adjusting the initial position of the rotor on the shaft to obtain the desired voltage at a certain predetermined minimum speed of rotation and an adjustment fixing the maximum speed which will give substantially the same voltage, and thus prevent undue change of voltage for any intermediate speed between said maximum and minimum.

A specific construction for accomplishing the foregoing objects is illustrated in the accompanying drawings, in which:

Figure 1 is a section of a generator designed according to this invention for lighting automobiles. Fig. 2 is a fragmentary detail, partly in elevation and partly sectional, of the governor and circuit breaker. Fig. 3 is a fragmentary elevation viewed from the line 3—3 of Fig. 1, and illustrating the relation of the contact members of the circuit breaker. Fig. 4 is a fragmentary detail showing the arrangement of the brushes and illustrating the splined joint between the shaft and the sleeve upon which the armature is mounted. Fig. 5 is a sectional detail illustrating the ball bearings which are interposed between the armature shaft and sleeve to reduce the friction between them.

In the construction shown in the drawings, the frame of the generator comprises the usual field or stator frame 1, provided with suitable pole pieces 2 and having brackets 3 supporting bearings for the shaft 4 of the armature or rotor. The rotor comprises a slotted core 5, provided with suitable windings connected in suitable manner with a commutator 6. The rotor core and commutator are mounted upon a sleeve 7, which is slidable in an axial direction on the shaft 4 but is prevented from relative rotation by means of a spline 8. Brushes 9 carried by brush holders 10 bear on the commutator 6 and are connected in the circuit in any usual manner by means of conductors 11. The face of the commutator is longer in an axial direction than the width of the brushes 9 so as to allow the rotor to shift axially while the brushes remain in contact with the commutator. A centrifugal governor controls the position of the rotor upon the shaft 4. In the form shown, this governor comprises a pair of spring arms bowed in opposite directions, having their middle parts perforated to receive the shaft 4 and having their ends connected together and carrying weights 13. The spring arms 12 are respectively connected by means of screws 14 with a collar 15 on the sleeve 7 and with a collar 16 which is splined to the shaft 4 and has a limited range of axial movement thereon. In addition, to spring arms 12, there is a conical governor spring 17 which bears between a collar 18 on the shaft 4 and the collar 15 and normally urges the rotor toward its normal initial position, that is, the position in which it is shown in Fig. 1. This position of the armature is determined by an adjustable stop collar 19, which has threaded engagement with the shaft 4, and which may be set to different positions on said shaft for adjusting the initial air gap. The collar 18 has a pin 20 extending through a slot 21 in the shaft 4. An adjusting screw 22 extends axially inward from the left-hand end of the shaft 4 and bears against the pin 20, thus serving to adjust the initial tension on the spring 17. The spring 17 is conical so that its resistance to compression will vary at an increasing rate since its turns of large diameter will yield more readily than those of small diameter and thus, by contacting with the collar 18, have the effect of gradually reducing the number of active turns as the spring is compressed.

A circuit breaker is provided for the purpose of making and breaking the main circuit of the generator when the speed of the rotor rises above or falls below the minimum speed which is necessary for producing a current of the desired voltage. This circuit breaker comprises a contact member 23 carried by a sleeve 24 and arranged to bridge a pair of stationary contacts 25. The sleeve 24 is urged into position for making the contact by means of a spring 26. This movement of the sleeve 24 is, however, resisted by the springs 12 when the machine is at rest, as indicated in Fig. 1. The collar 16 bears against the end of the sleeve 24 and is provided with an interposed series of antifriction balls 27, as in Fig. 1. The movement of the collar 16 toward the right of Fig. 1 is limited by means of a shoulder 28 on the shaft 4. The sleeve 24 is mounted on a stationary collar 29 which is concentric with the shaft 4 but secured against rotation by its connection with the stationary part of the bearing 3.

In the form shown in the drawings, the periphery of the rotor is of conoidal form, that is, its form resembles a cone, the longitudinal elements, however, being curved instead of being straight, as in a true cone. The faces of the pole pieces 2 are shaped to conform with the periphery of the rotor, as is indicated in Fig. 1. When the rotor is shifted toward the left of Fig. 1, it has the effect of increasing the air gap or its effective reluctance, so as to reduce the magnetic flux. Movement of the rotor toward the left of Fig. 1 is resisted by the magnetic force and also by the governor springs which will be hereinafter described. In the form shown in the drawings, the air gap is shown curved. This is for the purpose of accomplishing certain desirable results when the rotor is moved into and out of its initial position between the pole pieces. With an ordinary cylindrical armature, it is found that the pull at first is not very great, but increases rapidly to a sharp maximum, and then gradually falls off. The pull of a centrifugal governor increases with the speed but not at a uniform rate. Thus, with a cylindrical armature the relative strength of the governor and magnetic pull changes in an undesirable manner. The curved air gap, however, gives a magnetic pull which is of approximately maximum value initially and which does not decrease so rapidly as does that of a cylindrical armature, and it is therefore less difficult to provide an arrangement of springs which will resist the axial movement of the rotor so that the forces tending to produce such movement will be properly balanced at all times.

The operation of the device shown is as follows: It is assumed that the shaft 4 is connected in suitable manner with a source of power which has a variable speed, as for instance, the engine of an automobile or a windmill, and that it is connected up electrically in suitable manner for supplying current for operating a lighting system or for charging a storage battery or for some other use for which it is desirable to keep the voltage constant or within predetermined limits. It is also assumed that the circuit breaker is so connected by the conductors 30 that it controls the main circuit, either directly or indirectly. Normally, when the shaft is at rest, the parts will occupy the positions in which they are shown in Fig. 1. When the shaft 4 is rotated, the weights 13 of the governor tend to fly outward under the action of centrifugal force and thereby draw the middle parts of the springs 12 toward each other. As both the spring 17 and the magnetic pull of the rotor resist the shifting of the armature, the first movement which results from the flying outward of the weights 13 is to pull the collar 16 toward the right of Fig. 1. As soon as the speed is sufficient to produce the desired voltage, the collar 16 will be held at the limit of its movement toward the rotor and will allow the spring 26 to close the circuit at the contacts 25. For example, the springs 12 and weights 13 might be so proportioned that the rotation of the shaft 4 corresponding to a speed of the automobile of less than eight miles an hour would be insufficient to allow the contact 23 to engage the contacts 25, but as soon as the speed of eight miles an hour is reached, the circuit would be closed and it would remain closed for all speeds above eight miles an hour. As the speed of the vehicle increases, it will increase the speed of the shaft 4, causing increased outward pull by the weights 13 and shifting the rotor toward the left of Fig. 1 against the combined strength of the spring 17 and the magnetic pull of the stator. As the speed increases, the magnetic pull will gradually decrease, but the resistance of the spring 17 will increase. As the rotor 5 is shifted toward the left of Fig. 1, the air gaps between the rotor and pole pieces are increased and the magnetic flux is decreased. By adjusting the collar 19, it is possible to so regulate the initial air gaps that the voltage generated by the rotor will be of the correct value at the time when the governor first closes the circuit. This is the low speed adjustment and is made such that the voltage is correct when the automobile is operating at about eight miles an hour. By means of the adjusting screw 22, the tension of the spring 17 may be increased or decreased so that it will resist the action of the governor sufficiently to produce an air gap of such size that the same voltage will result when the shaft 4 is rotating at a speed corresponding to the highest speed of the automobile, say fifty or sixty miles an hour. It may be assumed that if the device is adjusted to produce the same voltage for both maximum and minimum speeds, that the various forces acting to shift the rotor axially will balance and produce a reasonably constant voltage during all intermediate speeds.

Although but one specific embodiment of this invention is herein shown and described, it will be understood that numerous details of the construction shown may be altered or omitted, within the scope of the following claim, without departing from the spirit of this invention.

We claim:—

In a dynamo-electric machine, the combination of a stator frame, a rotor shaft journaled in said frame and confined against axial movement, a sleeve splined on said shaft, a rotor mounted on said sleeve, a centrifugal governor mounted to rotate with said shaft and acting between said shaft and sleeve for shifting said sleeve axially through changes in the speed of said shaft, and a spring acting between said sleeve and shaft and adapted to normally resist the movement of said sleeve, said governor comprising two parts, one being secured to said sleeve and the other being mounted to have a limited axial movement on said shaft, and a circuit-breaker controlled by the relative movement of said parts.

Signed at Chicago the 29th day of October, 1909, by W. J. WARDER, Jr., and the 1st day of November, 1909, by C. H. ROTH.

CHARLES H. ROTH.
WALTER J. WARDER, JR.

Witnesses for Charles H. Roth:
EUGENE A. RUMMLER,
EDWIN PHELPS.

Witnesses for W. J. Warder, Jr.:
EUGENE A. RUMMLER,
PHILIP B. WOODWORTH.